(12) United States Patent
Zhou

(10) Patent No.: US 12,493,305 B2
(45) Date of Patent: Dec. 9, 2025

(54) DEVICE FOR SUPPLYING LIQUID AT CONSTANT AMOUNT AND METHOD FOR CONTROLLING SAME

(71) Applicant: NINGBO RICHEN ELECTRICAL APPLIANCE CO., LTD, Ningbo (CN)

(72) Inventor: Yin Zhou, Ningbo Province (CN)

(73) Assignee: NINGBO RICHEN ELECTRICAL APPLIANCE CO., LTD, Ningbo (CN)

( * ) Notice: Subject to any disclaimer, the term of this patent is extended or adjusted under 35 U.S.C. 154(b) by 0 days.

(21) Appl. No.: 18/662,795

(22) Filed: May 13, 2024

(65) Prior Publication Data
US 2024/0427357 A1 Dec. 26, 2024

(30) Foreign Application Priority Data

Jun. 25, 2023 (CN) .................. 202310750493.X
Jun. 25, 2023 (CN) .................. 202321612856.5

(51) Int. Cl.
*G05D 7/06* (2006.01)
*F23K 5/04* (2006.01)
*F23K 5/14* (2006.01)

(52) U.S. Cl.
CPC ............. *G05D 7/0682* (2013.01); *F23K 5/04* (2013.01); *F23K 5/142* (2013.01)

(58) Field of Classification Search
CPC ......... G05D 7/0682; F23K 5/04; F23K 5/142; F02M 37/0052; F04B 2207/703; F04B 23/025; F04B 23/06; F04B 43/02; F04B 49/025; F04B 13/00; G01F 11/28; G01F 11/00; B67D 7/08
See application file for complete search history.

(56) References Cited

U.S. PATENT DOCUMENTS 3,960,295 A * 6/1976 Horak ..................... B01F 35/88
137/392
4,162,218 A * 7/1979 McCormick ............ C02F 1/006
210/167.01

(Continued)

FOREIGN PATENT DOCUMENTS

CN 204491022 U 7/2015
CN 210399016 U 4/2020

(Continued)

*Primary Examiner* — Craig M Schneider
*Assistant Examiner* — Andrew J Rost
(74) *Attorney, Agent, or Firm* — Lathrop GPM LLP; Stephanie Vu

(57) ABSTRACT

Disclosed are a device for supplying liquid at a constant amount and a method for controlling the same, and the device for supplying liquid at a constant amount comprises a constant amount chamber, an input pump, an output pump, a liquid level detection device, and a controller; the input pump is provided with an input pump liquid feeding pipe and an input pump liquid discharging pipe; the output pump is provided with an output pump liquid feeding pipe and an output pump liquid discharging pipe; the input pump, the output pump, and the liquid level detection device are each in matched connection with the controller. In the present invention, by cyclic operation, a liquid volume between a high liquid level and a low liquid level is delivered at a constant amount in each cycle, so that liquid fuel is supplied at a constant amount.

12 Claims, 3 Drawing Sheets

(56) References Cited

U.S. PATENT DOCUMENTS

| | | | | |
|---|---|---|---|---|
| 4,284,210 A | * | 8/1981 | Horak | G01F 11/28 |
| | | | | 222/14 |
| 6,048,452 A | * | 4/2000 | Shades | A47K 11/023 |
| | | | | 96/219 |
| 6,200,104 B1 | * | 3/2001 | Park | F04F 1/02 |
| | | | | 417/118 |
| 2007/0051173 A1 | * | 3/2007 | Baniahmad | G01F 23/243 |
| | | | | 73/291 |
| 2012/0251333 A1 | * | 10/2012 | Irwin | E03F 5/22 |
| | | | | 417/1 |
| 2024/0427357 A1 | | 12/2024 | Zhou | |

FOREIGN PATENT DOCUMENTS

| | | |
|---|---|---|
| CN | 210716971 U | 6/2020 |
| CN | 211853480 U | 11/2020 |

\* cited by examiner

DEVICE FOR SUPPLYING LIQUID AT CONSTANT AMOUNT AND METHOD FOR CONTROLLING SAME

RELATED APPLICATIONS

This application claims the benefit of Chinese Patent Application No. 202310750493. X and Chinese Patent Application No. 202321612856.5, both filed Jun. 25, 2023, the entire disclosures of which are hereby incorporated herein by reference.

TECHNICAL FIELD

The present invention relates to the technical field of liquid fuel fireplaces, and in particular, to a device for supplying liquid at a constant amount and a method for controlling the same.

BACKGROUND ART

Liquid fuel fireplaces are becoming increasingly popular with consumers because they feature clean burning, modern design of products, and no need to use special fuel supply pipes.

During operation, in order to ensure constant average power of liquid fuel fireplaces and thereby achieve stable combustion, it is necessary to keep the fuel supply rate constant. For example, in the gasified ethanol fireplace described in Patent Application No. 201921102287.3, the component that provides power to the liquid supply device is an infusion pump, by means of which a stable supply of liquid fuel is achieved. A pump currently on the market that can achieve a constant delivery rate is generally a constant displacement pump, as shown in Patent Application No. 202030316753. X, and in such a constant displacement pump, a rubber tube for delivering a constant amount of liquid is likely to age due to the stress under cyclic pressing when used for a long period of time, resulting in a small flow rate. If a liquid fuel fireplace uses such a constant displacement pump to stably supply the liquid fuel, the combustion power of the fireplace becomes small and stable combustion cannot be achieved, or even normal operation cannot be performed; besides, existing constant displacement pumps are expensive and troublesome to maintain.

SUMMARY OF THE INVENTION

The technical problem to be solved by the present invention is to overcome the technical defects of unstable fuel supply and short service life of the liquid fuel fireplaces in the prior art, and a device for supplying liquid at a constant amount and a method for controlling the same are provided. In the present invention, by cyclic operation, a liquid volume between a high liquid level and a low liquid level is delivered at a constant amount in each cycle, so that liquid fuel is supplied at a constant amount, which effectively solves the problem of unstable liquid supply due to the aging of the rubber tube of constant displacement pumps in the prior art; in addition, both the input pump and the output pump of the present invention may be inexpensive diaphragm pumps in the prior art and feature simple structure, low cost, and convenient application.

The technical solutions adopted by the present invention to solve the above technical problems are as follows:

Provided is a device for supplying liquid at a constant amount, which comprises a constant amount chamber, an input pump, an output pump, a liquid level detection device, and a controller; the constant amount chamber is provided with a liquid inlet and a liquid outlet; the input pump and the output pump may be diaphragm pumps with no requirements for a constant flow rate in the prior art; the input pump is provided with an input pump liquid feeding pipe and an input pump liquid discharging pipe; the output pump is provided with an output pump liquid feeding pipe and an output pump liquid discharging pipe; the input pump liquid discharging pipe is connected to the liquid inlet; the output pump liquid feeding pipe is connected to the liquid outlet; the liquid level detection device is provided with a high liquid level detection probe and a low liquid level detection probe, the high liquid level detection probe and the low liquid level detection probe are provided inside the constant amount chamber, the high liquid level detection probe is provided at a height higher than that of the low liquid level detection probe, the high liquid level detection probe is used for detecting a high liquid level in the constant amount chamber, and the low liquid level detection probe is used for detecting a low liquid level in the constant amount chamber; the input pump, the output pump, and the liquid level detection device are all connected to the controller, and the controller controls operations of the input pump, the output pump, and the liquid level detection device.

Further, both the liquid inlet and the liquid outlet are provided lower than the low liquid level detection probe, so that not only the liquid level does not fluctuate and the detection of the liquid level is not affected during liquid feeding or liquid discharging of the constant amount chamber, but also liquid in the input pump liquid discharging pipe and/or the output pump liquid feeding pipe does not affect the volume between the high liquid level detection probe and the low liquid level detection probe.

Further, an overflow port is also provided in the constant amount chamber, and the overflow port is provided higher than the high liquid level detection probe; the liquid in the constant amount chamber may flow out of the overflow port when the liquid level detection device malfunctions; In addition, the overflow port may serve as a breathing port of the constant amount chamber, so that the pressure inside the constant amount chamber can be balanced and the pressure does not increase due to continuous inflow of liquid.

Further, since the diaphragm pump with no requirements for a constant flow rate in the prior art generally has a relatively large and unstable flow rate, a first orifice plug is provided in the input pump liquid feeding pipe and a diameter of a cross section of the first orifice plug is smaller than an inner diameter of the input pump liquid feeding pipe, so that the first orifice plug can not only stabilize the flow rate of the input pump, but also reduce the flow rate of the input pump to achieve fine control, thereby avoiding an error occurring when the high liquid level detection probe and/or the low liquid level detection probe do not detect in time due to an excessive flow rate of the input pump.

Further, a second orifice plug is provided in the output pump liquid feeding inlet pipe, and a diameter of a cross section of the second orifice plug is smaller than an inner diameter of the output pump liquid feeding pipe, so that the flow velocity when the output pump outputs liquid to the outside can be made smoother.

Further, the device for supplying liquid at a constant amount also comprises an overflow liquid storage chamber. The overflow storage chamber is provided with an overflow pipe, and the overflow storage chamber is connected to the overflow port via the overflow pipe to store liquid overflowing from the overflow port.

Further, the overflow storage chamber is provided lower than the overflow port to facilitate the flow of liquid from the overflow port to the overflow storage chamber.

Further, a liquid level alarm device is provided on a lower part of the overflow storage chamber. The liquid level alarm device is connected to the controller, and the liquid level alarm device sends an alarm signal to the controller when there is liquid in the overflow storage chamber.

Further, the overflow storage chamber is provided with a vent, and the vent is provided at the top of the overflow storage chamber; the vent may serve as a breathing port of the overflow storage chamber, so that the pressure in the overflow storage chamber is balanced with the outside, and the pressure does not increase due to the continuous inflow of liquid; since the overflow port is in communication with the overflow storage chamber, the overflow port may serve as a breathing port of the constant amount chamber, so that the pressure in the constant amount chamber does not increase due to continuous inflow of liquid.

Provided is a method for controlling a device for supplying liquid at a constant amount, which comprises the following steps:

step 1: at the beginning of the operation, controlling, by the controller, the input pump to inject liquid fuel into the constant amount chamber until a liquid level in the constant amount chamber reaches the high liquid level, wherein this stage is a pre-adding process of the liquid fuel in the constant amount chamber;

step 2: during normal operation, allowing the device for supplying liquid at a constant amount to operate cyclically, wherein in one cycle, at the beginning, the output pump draws liquid from the constant amount chamber through the output pump liquid feeding pipe to supply the liquid to outside until a liquid level of liquid in the constant amount chamber drops to the low liquid level, then the input pump is started immediately at this moment or after waiting for a certain period of time to inject liquid into the constant amount chamber through the input pump liquid feeding pipe and the input pump liquid discharging pipe until liquid in the constant amount chamber reaches the high liquid level, and then after the time set for one cycle is finished, the output pump is restarted, thus starting the next cycle; since the time T of each cycle is fixed, the cross-sectional area S of the constant amount chamber is also fixed, and the distance H between the high liquid level detection probe and the low liquid level detection probe is also fixed, the average flow rate (V=S×H÷T) of the liquid fuel discharged to the outside by device for supplying liquid at a constant amount via the output pump is also fixed, that is, a certain amount of liquid is delivered to the outside per unit time, so that liquid fuel is supplied at a constant amount.

Further, the one cycle is 5 s to 5 min.

Further, the one cycle is 1.5 min to 2 min.

Further, in one cycle, continuous operation time of the output pump is longer than that of the input pump.

Further, when the liquid level detection device malfunctions, due to the presence of the overflow storage chamber, overflowing liquid may be stored and the liquid level alarm device can timely send a signal to the controller to provide an alarm and immediately stop the operation of the input pump and the output pump when the liquid overflows from the constant amount chamber.

Provided is a method for supplying liquid at a constant amount, which comprises the following steps:

(1) pre-adding stage: liquid is injected into a liquid storage area until a liquid level of liquid in the liquid storage area reaches a high liquid level;

(2) cyclic operation stage: liquid is drawn from the liquid storage area to supply the liquid to the outside until a liquid level of liquid in the liquid storage area drops to a low liquid level, then liquid is injected into the liquid storage area immediately at this moment or after waiting for a certain period of time until a liquid level of liquid in the liquid storage area reaches a high liquid level, and then after the time set for one cycle is finished, liquid is drawn from the liquid storage area again, thus starting the next cycle.

Further, the one cycle is 5 s to 5 min.

Further, the one cycle is 1.5 min to 2 min.

Further, in one cycle, the operation time for outward liquid supply is longer than operation time for liquid injection.

Basic Principle of the Present Invention

According to the present invention, after liquid is pre-added to the constant amount chamber, at the start of each cycle, the output pump draws the liquid from the constant amount chamber to supply the liquid to the outside until the liquid drops to a low liquid level, and then the input pump is started to inject liquid into the constant amount chamber until the liquid reaches a high liquid level, and then the next cycle is expected to be started; since the cycle time is constant, the volume of the liquid discharged to the outside by the output pump in one cycle is fixed, so that the liquid fuel is supplied at a constant amount.

Compared with the prior art, the advantageous effects of the present invention are as follows:

The present invention provides a device for supplying liquid at a constant amount and a method for controlling the same; by cyclic operation, a liquid volume between a high liquid level and a low liquid level is delivered at a constant amount in each cycle, so that liquid fuel is supplied at a constant amount, which effectively solves the problem of unstable liquid supply due to the aging of the rubber tube of constant displacement pumps in the prior art; in addition, both the input pump and the output pump of the present invention may be inexpensive diaphragm pumps in the prior art and feature simple structure, low cost, and convenient application.

Figure 1:
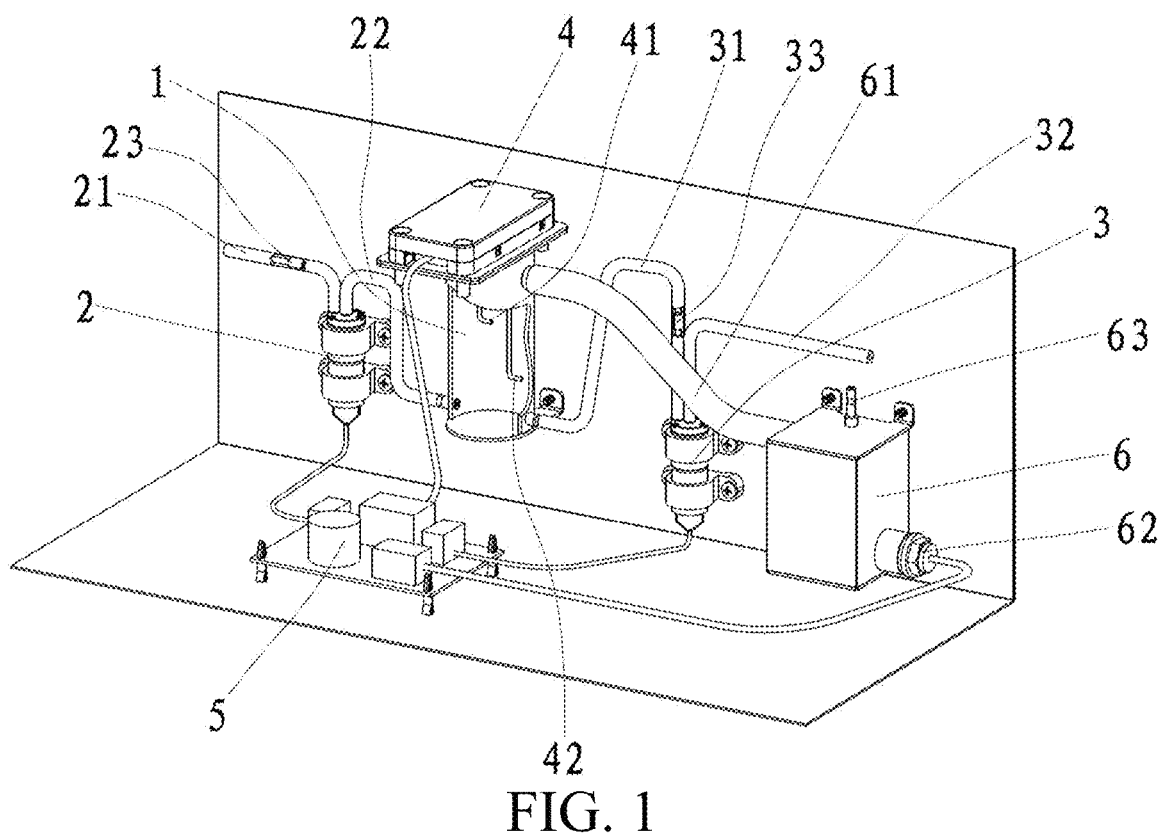
FIG. 1 is a schematic view of the three-dimensional structure of Embodiment 1 of the present invention.

The names of the components corresponding to the respective reference numerals in the figures are as follows:

1—constant amount chamber; 11—liquid inlet; 12—liquid outlet; 13—overflow port; 2—input pump; 21—input pump liquid feeding pipe; 22—input pump liquid discharging pipe; 23—first orifice plug; 3—output pump; 31—output pump liquid feeding pipe; 32—output pump liquid discharging pipe; 33—second orifice plug; 4—liquid level detection device; 41—high liquid level detection probe; 42—low liquid level detection probe; 5—controller; 6—overflow storage chamber; 61—overflow pipe; 62—liquid level alarm device; 63—vent.

DETAILED DESCRIPTION

For a better understanding of the content of the present invention, further description will be made below with reference to specific embodiments and the accompanying drawings. It is to be understood that these embodiments are provided for further illustration of the present invention only and are not intended to limit the scope of the present invention. Further, it is to be understood that after reading the content of the present invention, those skilled in the art may make some non-essential alterations or modifications to the present invention, which still fall within the protection scope of the present invention.

Embodiment 1

Figure 2:
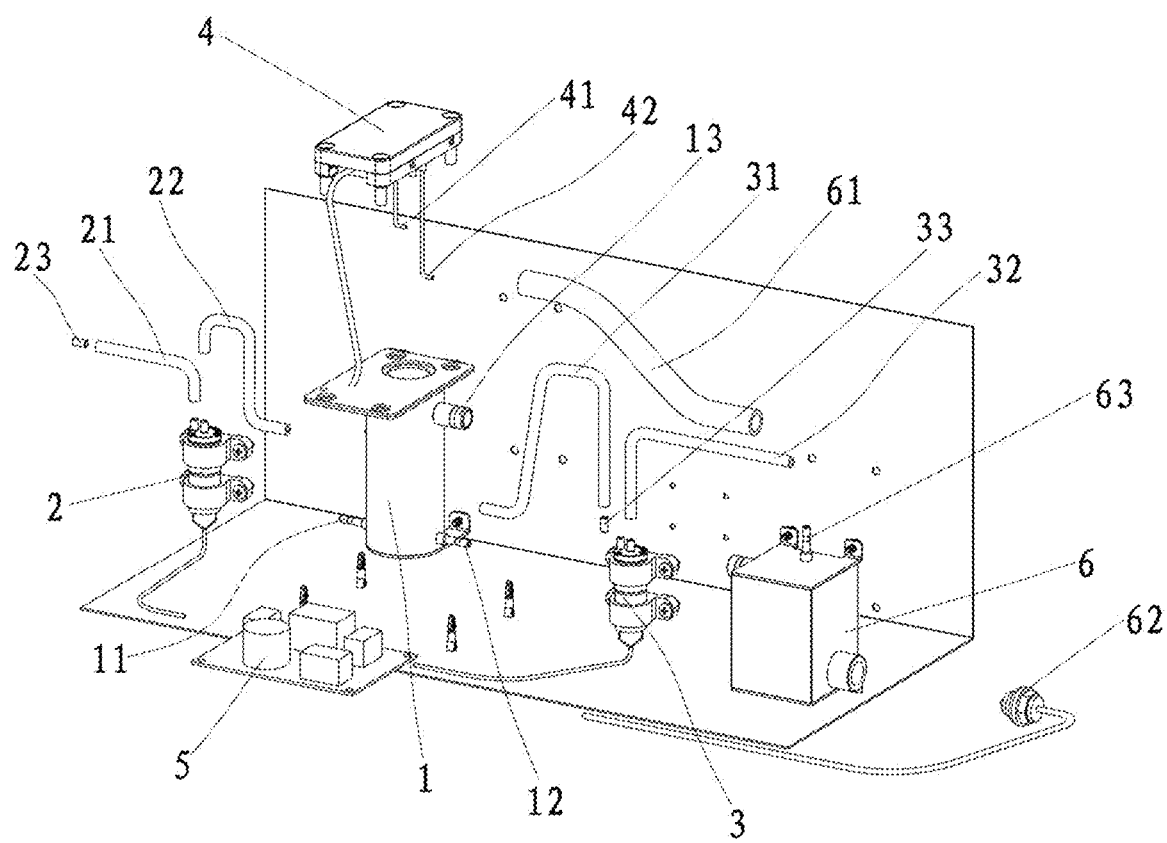
FIG. 2 is a schematic view of the exploded structure of Embodiment 1 of the present invention.
Figure 3:
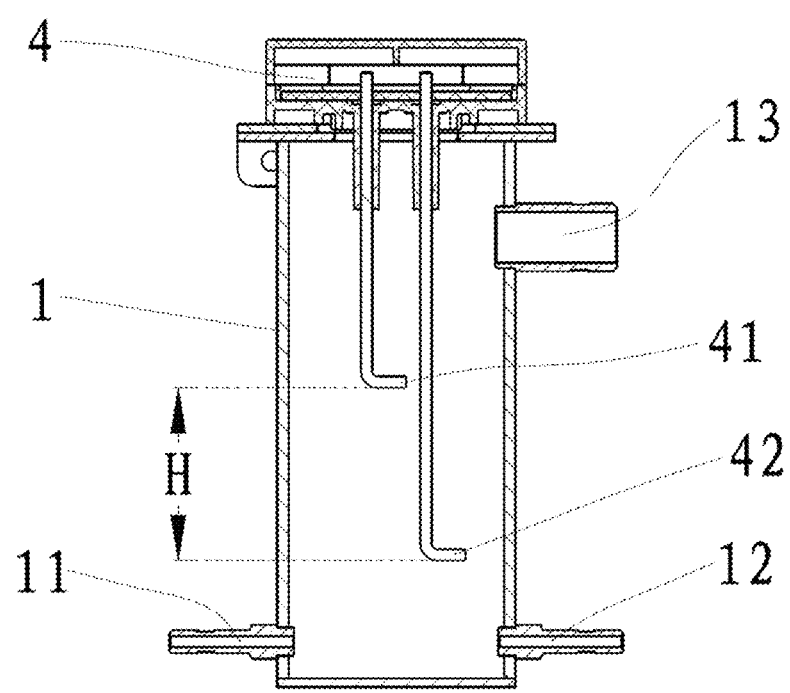
FIG. 3 is a semi-sectional structural view of the assembly state of the constant amount chamber and the liquid level detection device of Embodiment 1 of the present invention.
Figure 4:
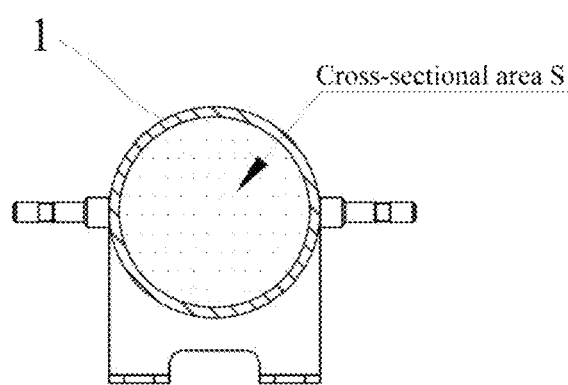
FIG. 4 is a semi-sectional structural view of the cross section of the constant amount chamber of Embodiment 1 of the present invention.

A device for supplying liquid at a constant amount, as shown in FIGS. 1 to 4, comprises a constant amount chamber 1, an input pump 2, an output pump 3, a liquid level detection device 4, and a controller 5; the constant amount chamber 1 is provided with a liquid inlet 11 and a liquid outlet 12; the input pump 2 and the output pump 3 are diaphragm pumps with no requirements for a constant flow rate in the prior art; the input pump 2 is provided with an input pump liquid feeding pipe 21 and an input pump liquid discharging pipe 22; the output pump 3 is provided with an output pump liquid feeding pipe 31 and an output pump liquid discharging pipe 32; the input pump liquid discharging pipe 22 of the input pump 2 is connected to the liquid inlet 11; the output pump liquid feeding pipe 31 of the output pump 3 is connected to the liquid outlet 12; the input pump liquid feeding pipe 21 is a pipe for drawing liquid from a liquid storage container; a first orifice plug 23 is also provided in the input pump liquid feeding pipe 21, and a diameter of a cross section of the first orifice plug 23 is smaller than an inner diameter of the input pump liquid feeding pipe 21; the output pump 3 outputs liquid fuel through the output pump liquid discharging pipe 32 to outside, and the outside may be a balancing chamber described in Patent Application No. 201921102287.3; a second orifice plug 33 is also provided in the output pump liquid feeding pipe 31, and a diameter of a cross section of the second orifice plug 33 is smaller than an inner diameter of the output pump liquid feeding pipe 31; a liquid level detection device 4 is provided at the top of the constant amount chamber 1; the liquid level detection device 4 is provided with a high liquid level detection probe 41 and a low liquid level detection probe 42; the high liquid level detection probe 41 and the low liquid level detection probe 42 are provided inside the constant amount chamber 1, the high liquid level detection probe 41 is provided at a height higher than that of the low liquid level detection probe 42, the high liquid level detection probe 41 is used for detecting a high liquid level in the constant amount chamber 1, and the low liquid level detection probe 42 is used for detecting a low liquid level in the constant amount chamber 1; both the liquid inlet 11 and the liquid outlet 12 are provided lower than the low liquid level detection probe 42; the input pump 2, the output pump 3, and the liquid level detection device 4 are all connected to a controller 5, and the controller 5 controls operations of the input pump 2, the output pump 3, and the liquid level detection device 4; an overflow port 13 is also provided in the constant amount chamber 1, and a height of the overflow port 13 is higher than that of the high liquid level detection probe 41.

The device for supplying liquid at a constant amount in this embodiment also comprises an overflow storage chamber 6, and the overflow storage chamber 6 is lower than the overflow port 13; the overflow storage chamber 6 is provided with an overflow pipe 61, and the overflow storage chamber 6 is connected to the overflow port 13 via the overflow pipe 61 to store liquid overflowing from the overflow port 13; a liquid level alarm device 62 is provided on a lower part of a side of the overflow storage chamber 6; the liquid level alarm device 62 is connected to the controller 5; a vent 63 is also provided at the top of the overflow storage chamber 6.

Operating Principle of the Device for Supplying Liquid at a Constant Amount in This Embodiment At the beginning of the operation of the device for supplying liquid at a constant amount in this embodiment, the controller 5 controls the input pump 2 to inject liquid fuel from the liquid storage container into the constant amount chamber 1 until the liquid level in the constant amount chamber 1 reaches a high liquid level, and this stage is a pre-adding process of the liquid fuel in the constant amount chamber 1.

During normal operation, the device for supplying liquid at a constant amount in this embodiment operates cyclically. In one cycle, at the beginning, the output pump 3 draws liquid from the constant amount chamber 1 through the output pump liquid feeding pipe 31 to supply the liquid to outside until a liquid level of liquid in the constant amount chamber 1 drops to the low liquid level, then the input pump 2 is started immediately at this moment or after waiting for a certain period of time to inject liquid fuel into the constant amount chamber 1 through the input pump liquid feeding pipe 21 and the input pump liquid discharging pipe 22 until liquid in the constant amount chamber 1 reaches the high liquid level, and then after the time set for one cycle is finished, the output pump 3 is restarted, thus starting the next cycle. Since the time T of each cycle is fixed, the cross-sectional area S of the constant amount chamber 1 is also fixed, and the distance H between the high liquid level detection probe 41 and the low liquid level detection probe 42 is also fixed, the average flow rate (V=S×H÷T) of the liquid fuel discharged to the outside via the output pump 2 in this embodiment is also fixed, that is, a certain amount of liquid is delivered to the outside per unit time, so that liquid fuel is supplied at a constant amount.

In this embodiment, the first orifice plug 23 and the second orifice plug 33 function to slow down flow velocity of the input pump 2 and the output pump 3, respectively, so that the continuous operation time of the input pump 1 and the output pump 2 in each cycle more matches the cross-sectional area S of the constant amount chamber 1 and the distance H between the high liquid level detection probe 41 and the low liquid level detection probe 42.

When the liquid level detection device 4 malfunctions and the liquid overflows from the overflow port 13 of the constant amount chamber 1, the overflowing liquid fuel can flow to the overflow storage chamber 6 through the overflow pipe 61 for storage, and the liquid level alarm device 62 can timely feed back a signal to the controller 5 to provide an alarm and stop the operation of the input pump 2 and the output pump 3.

Further, by providing the vent 63, the pressure in the overflow storage chamber 6 is balanced with the outside, so that the pressure does not increase due to the continuous inflow of the liquid fuel; since the overflow port 13 is in communication with the overflow storage chamber 6, the overflow port 13 may serve as a breathing port of the constant amount chamber 1, so that the pressure in the constant amount chamber 1 does not increase due to continuous inflow of the liquid, thereby ensuring smooth operation of the entire device.

The above description does not limit the present invention, and the present invention is not limited to the above examples. Changes, modifications, additions, or substitutions made by those of ordinary skill in the art within the essence of the present invention shall also fall within the protection scope of the present invention.

The invention claimed is:

1. A device for supplying liquid at a constant amount, comprising a constant amount chamber (1), an input pump (2), an output pump (3), a liquid level detection device (4), and a controller (5), wherein the constant amount chamber is provided with a liquid inlet (11) and a liquid outlet (12); the input pump (2) is provided with an input pump liquid feeding pipe (21) and an input pump liquid discharging pipe (22); the output pump (3) is provided with an output pump liquid feeding pipe (31) and an output pump liquid discharging pipe (32); the liquid inlet (11) is in matched connection with the input pump liquid discharging pipe (22); the liquid outlet (12) is in matched connection with the output pump liquid feeding pipe (31); the liquid level detection device (4) is provided with a high liquid level detection probe (41) and a low liquid level detection probe (42); the high liquid level detection probe (41) and the low liquid level detection probe (42) are provided inside the constant amount chamber (1); the high liquid level detection probe (42) is provided at a height higher than that of the low liquid level detection probe (41); the high liquid level detection probe (42) is used for detecting a high liquid level in the constant amount chamber (1), and the low liquid level detection probe (41) is used for detecting a low liquid level in the constant amount chamber (1); the input pump (2), the output pump (3), and the liquid level detection device (4) are each in matched connection with the controller (5), wherein the input pump (2) and the output pump (3) are diaphragm pumps.

2. The device for supplying liquid at a constant amount according to claim 1, wherein the liquid inlet (11) and the liquid outlet (12) are each provided at a height lower than that of the low liquid level detection probe (42).

3. The device for supplying liquid at a constant amount according to claim 1, wherein the constant amount chamber (1) is provided with an overflow port (13); the overflow port (13) is provided at a height higher than that of the high liquid level detection probe (41).

4. The device for supplying liquid at a constant amount according to claim 3, comprising an overflow storage chamber (6), wherein the overflow storage chamber (6) is provided with an overflow pipe (61); the overflow pipe (61) is in matched connection with the overflow port (13).

5. The device for supplying liquid at a constant amount according to claim 4, wherein the overflow storage chamber (6) is provided at a height lower than that of the overflow port (13).

6. The device for supplying liquid at a constant amount according to claim 4, wherein the overflow storage chamber (6) is provided with a liquid level alarm device (62); the liquid level alarm device (62) is in matched connection with the controller (5).

7. The device for supplying liquid at a constant amount according to claim 4, wherein the overflow storage chamber (6) is provided with a vent (63).

8. The device for supplying liquid at a constant amount according to claim 1, wherein the input pump liquid feeding pipe (21) is provided with a first orifice plug (23); a diameter of a cross section of the first orifice plug (23) is smaller than an inner diameter of the input pump liquid feeding pipe (21).

9. The device for supplying liquid at a constant amount according to claim 1, wherein the output pump liquid feeding pipe (31) is provided with a second orifice plug (33); a diameter of a cross section of the second orifice plug (33) is smaller than an inner diameter of the output pump liquid feeding pipe (31).

10. A method for controlling the device for supplying liquid at a constant amount according to claim 1, comprising the following steps:
    step 1: at the beginning of the operation, controlling, by the controller (5), the input pump (2) to inject liquid fuel into the constant amount chamber (1) until a liquid level in the constant amount chamber (1) reaches the high liquid level, wherein this stage is a pre-adding process of the liquid fuel in the constant amount chamber (1);
    step 2: during normal operation, allowing the device for supplying liquid at a constant amount to operate cyclically, wherein in one cycle, at the beginning, the output pump (3) draws liquid from the constant amount chamber (1) through the output pump liquid feeding pipe (31) to supply the liquid to outside until a liquid level of liquid in the constant amount chamber (1) drops to the low liquid level, then the input pump (2) is started immediately at this moment or after waiting for a certain period of time to inject liquid into the constant amount chamber (1) through the input pump liquid feeding pipe (21) and the input pump liquid discharging pipe (22) until liquid in the constant amount chamber (1) reaches the high liquid level, and then after the time set for one cycle is finished, the output pump (3) is restarted, thus starting the next cycle.

11. The method for controlling the device for supplying liquid at a constant amount according to claim 10, wherein the one cycle is 5 s to 5 min.

12. The method for controlling the device for supplying liquid at a constant amount according to claim 10, wherein in one cycle, continuous operation time of the output pump (3) is longer than that of the input pump (2).

* * * * *